(12) United States Patent
Florkey et al.

(10) Patent No.: US 8,000,695 B2
(45) Date of Patent: Aug. 16, 2011

(54) COMMUNICATION DEVICE EMPLOYMENT OF ONE OR MORE RESTRICTIONS TO MAKE DETERMINATION OF ALLOWABILITY OF ONE OR MORE COMMUNICATION SESSIONS

(75) Inventors: Cynthia Kae Florkey, Chicago, IL (US); Victoria Marie Halsell, Aurora, IL (US); Karla Rae Hunter, Naperville, IL (US); Mrinal Milind Joglekar, Woodridge, IL (US); Ronald Bruce Martin, Carol Stream, IL (US)

(73) Assignee: Alcatel Lucent, Paris (FR)

( * ) Notice: Subject to any disclaimer, the term of this patent is extended or adjusted under 35 U.S.C. 154(b) by 1097 days.

(21) Appl. No.: 10/609,861

(22) Filed: Jun. 30, 2003

(65) Prior Publication Data

US 2005/0027830 A1 Feb. 3, 2005

(51) Int. Cl.
*H04M 3/00* (2006.01)
*H04M 11/00* (2006.01)
(52) U.S. Cl. .......................... 455/420; 455/406
(58) Field of Classification Search .......... 455/405–408; 340/539.15
See application file for complete search history.

(56) References Cited

U.S. PATENT DOCUMENTS

| | | | | |
|---|---|---|---|---|
| 5,920,820 | A | * | 7/1999 | Qureshi et al. ............... 455/461 |
| 6,393,464 | B1 | * | 5/2002 | Dieterman .................... 709/206 |
| 6,718,178 | B1 | * | 4/2004 | Sladek et al. ................. 455/466 |
| 2002/0126821 | A1 | * | 9/2002 | Barak et al. ................... 379/219 |
| 2003/0065947 | A1 | * | 4/2003 | Song et al. .................... 713/201 |
| 2003/0109988 | A1 | * | 6/2003 | Geissler et al. ............... 701/213 |
| 2003/0115335 | A1 | * | 6/2003 | Yoshida et al. ............... 709/228 |
| 2003/0119560 | A1 | * | 6/2003 | Takatori et al. ............... 455/564 |
| 2003/0225836 | A1 | * | 12/2003 | Lee et al. ...................... 709/205 |
| 2005/0136949 | A1 | * | 6/2005 | Barnes, Jr. .................... 455/461 |

* cited by examiner

*Primary Examiner* — Lester Kincaid
*Assistant Examiner* — Joel Ajayi
(74) *Attorney, Agent, or Firm* — Carmen Patti Law Group, LLC

(57) ABSTRACT

A first communication device of an apparatus in one example shares a billing relationship with a second communication. The second communication device comprises a primary communication device, where a user associated with the second communication device comprises a primary user associated with the primary communication device. The primary user associated with the primary communication device sets one or more restrictions for the first communication device. The first communication device employs one or more of the one or more restrictions to make a determination of allowability of one or more communication sessions.

34 Claims, 4 Drawing Sheets

COMMUNICATION DEVICE EMPLOYMENT OF ONE OR MORE RESTRICTIONS TO MAKE DETERMINATION OF ALLOWABILITY OF ONE OR MORE COMMUNICATION SESSIONS

TECHNICAL FIELD

The invention relates generally to communications and more specifically to call restrictions.

BACKGROUND

Users of communication devices desire to take part in shared billing plans to keep down expenses. The communication devices in one example comprise mobile phones, personal digital assistants, soft phones, and computers. The shared billing plans in one example comprise one or more of a shared mobile group plan and corporate shared plan. A user of the users of the communication devices in the shared billing plans comprises a primary user. For example, the primary user pays for expenses of the shared billing plan.

The primary user in one example may wish to set one or more restrictions on one or more communication sessions that the users of the communication devices can partake in. For example, the shared billing plan may allow the primary user to set the restrictions for the communication devices in a communication network. The restrictions in one example allow the primary user to block one or more of an outgoing call, an incoming call, and a time period for a call. As one shortcoming, the users of the communication devices are aware of the restrictions. As another shortcoming, the primary user is not able to monitor communication sessions of the users of the communication devices of the shared billing plan. For example, the primary user is not aware of an attempt to place a blocked call. As yet another shortcoming, the primary user is not able to update the restrictions easily and/or quickly.

Thus, a need exists for a user of a shared billing plan to set one or more restrictions on one or more communication devices of the shared billing plan. A further need exists to enable the user to monitor one or more communication sessions of the one or more communication devices.

SUMMARY

The invention in one embodiment encompasses an apparatus. The apparatus comprises a first communication device that shares a billing relationship with a second communication device. The second communication device comprises a primary communication device, where a user associated with the second communication device comprises a primary user associated with the primary communication device. The primary user associated with the primary communication device sets one or more restrictions for the first communication. The first communication device employs one or more of the one or more restrictions to make a determination of allowability of one or more communication sessions.

Another embodiment of the invention encompasses a method. One or more restrictions set by a user associated with a second communication device are received at a first communication device, where the first communication device shares a billing relationship with the second communication device. One or more of the one or more restrictions are employed at the first communication device to make a determination of allowability of one or more communication sessions.

Yet another embodiment of the invention encompasses an article. The article comprises one or more computer-readable media. The article comprises means in the computer-readable medium for receiving at a first communication device one or more restrictions set by a user associated with a second communication device, where the first communication device shares a billing relationship with the second communication device. The article comprises means in the computer-readable medium for employing at the first communication device one or more of the one or more restrictions to make a determination of allowability of one or more communication sessions.

DESCRIPTION OF THE DRAWINGS

Features of exemplary implementations of the invention will become apparent from the description, the claims, and the accompanying drawings in which:

DETAILED DESCRIPTION

Figure 1:
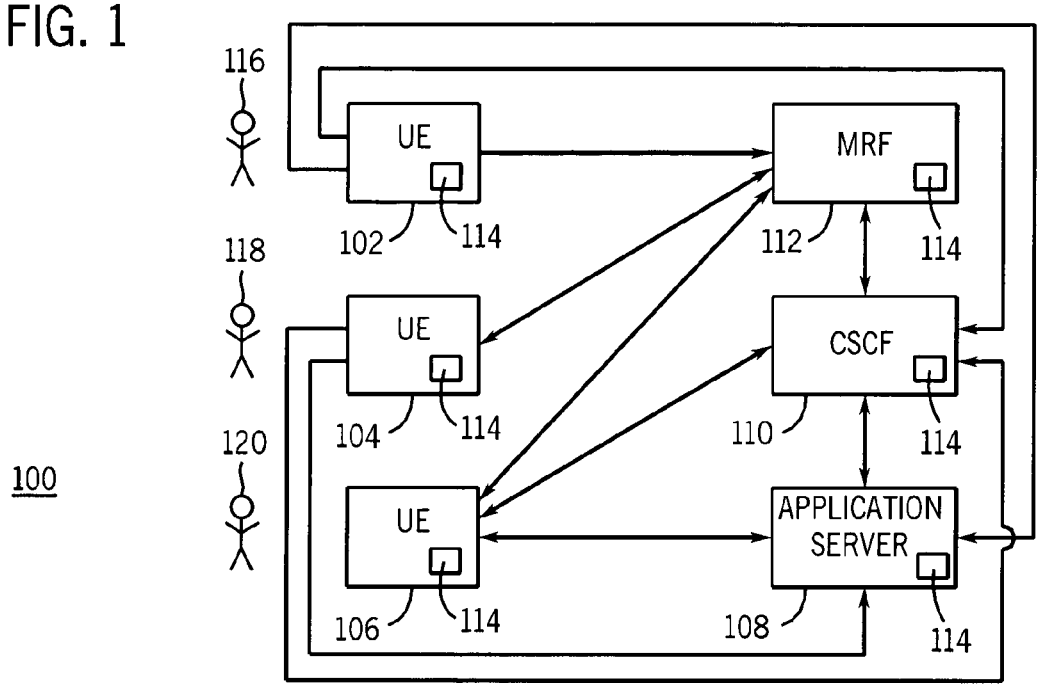
FIG. 1 is a representation of an exemplary implementation of an apparatus that comprises one or more communication devices, one or more application server components, one or more control components, and one or more media resource components.
Figure 2:
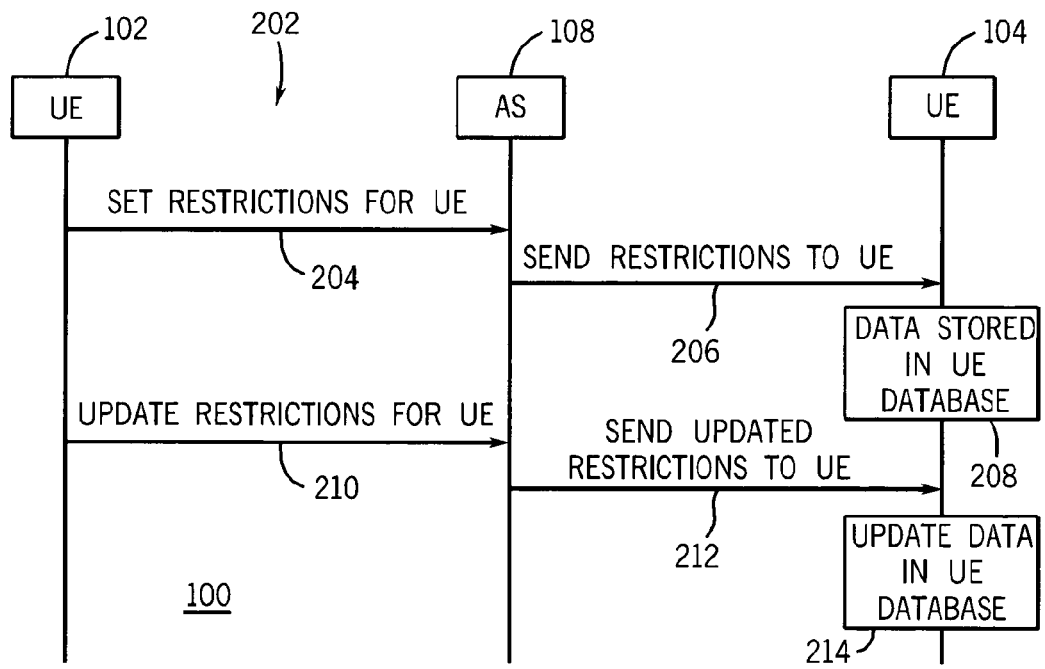
FIG. 2 is a representation of an exemplary implementation of a message flow illustrating an employment of restrictions and updates of the restrictions by the communication device of FIG. 1.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more communication devices 102, 104, and 106, one or more application server components 108, one or more control components 110, and one or more media resource components 112. The apparatus 100 in one example comprises a telecommunications and/or computer network. One or more users 116, 118, and 120 employ the one or more communication devices 102, 104, and 106 for communication. For example, the user 118 employs the communication device 104 to engage in a communication session with the user 120 of the communication device 106.

The communication session in one example comprises one or more of a data session, an incoming call, and an outgoing call. The communication session in one example comprises session information. For example, the session information comprises one or more of a time of day, a user name, a phone number, and a website address. The users 116, 118, and 120 employ one or more of the communication devices 102, 104, and 106 to communicate in the communication session. The communication devices 102, 104, and 106 in one example comprise one or more of a mobile phone, a personal digital assistant, a soft phone, and a computer. For example, one or more of the communication devices 102, 104, and 106 comprise user equipment ("UE"). The communication device 102 in one example comprises a primary user equipment. The communication devices 102, 104, and 106 comprise one or more of an alpha-numeric keypad, a microphone, a speaker, and a display. The communication devices 102, 104, and 106 in one example comprise an instance of a recordable data storage medium 114.

One or more of the users 116, 118, and 120 of the communication devices 102, 104, and 106 in one example share a billing relationship. For example, the billing relationship comprises a shared mobile group plan. The user 116 in one example comprises a primary user. For example, the user 116 is a parent and the user 118 is a child. The user 116 pays the bill of the user 118. For example, the user 116 of the communication device 102 sets one or more restrictions for the user 118 of the communication device 104.

The user 116 sets the one or more restrictions at the application server component 108. For example, the user 116 sets the restrictions at a website associated with the application server component 108. The communication device 104 in one example registers with the control component 110 upon one or more of a power up of the communication device 104, a connection of the communication device 104 with a new mobile service switching center ("MSC"), and a set length of time. Once the user 116 sets or updates the restrictions and the communication device 104 registers with the control component 110, the communication device 104 in one example downloads the restrictions from the application server component 108 or the control component 110. The communication device 104 comprises an internal database to store one or more of the restrictions and the updates. The user 118 of the communication device 104 in one example is unaware of the restrictions.

In one example, the restrictions allow the communication device 104 to make a determination of allowability of one or more communication sessions. For example, the communication device 104 allows or rejects one or more of an incoming call, an outgoing call, email usage, instant message usage, short message service usage ("SMS"), and Internet usage. The determinations of allowability comprise one or more of an allowance and a rejection. One or more of the allowance and the rejection in one example are based on the restrictions that comprise one or more of a time of day, length of the communication session, minute proportioning, a phone number, an email address, an instant message handle address, a short message service address, a website, and a user name. For example, to make the determination of allowability, the communication device 104 compares the session information of a communication session with the restrictions at the communication device 104.

Upon the determination of allowability, the restrictions allow the user 116 of the communication device 102 to monitor the communication sessions of one or more of the users 118 and 120 of the communication devices 104 and 106. For example, the communication device 104 sends one or more notifications of the communication session to the application server component 108. The application server component 108 sends the one or more notifications to the communication device 102. The notifications in one example comprise one or more of a time of day, a length of the communication session, a phone number, an email address, an instant message handle address, a short message service address, a website, and a user name. For example, the user 116 of the communication device 102 employs the notifications to monitor the communication session of the communication devices 104 and 106. The notifications in one example comprise one or more of a voice message, an email, an SMS message, and an instant message.

In another example, the restrictions allow the user 116 to set one or more provisions of a communication session of the communication device 104. For example, the user 116 may set a restriction to shut off the communication device 104 from 9:00 a.m. to 5:00 p.m. At 5:00 p.m., the provision allows the user 118 to download a game from the Internet on the communication device 104.

The users 116, 118, and 120 employ the communication devices 102, 104, and 106 to access the Internet, utilize email, communicate instant messages, transfer short message service messages, place the outgoing calls, receive one or more of the incoming calls, the restrictions, and the notifications, and display the determinations of allowability. For example, the users 116, 118, and 120 employ the alpha-numeric keypad and/or the microphone of the communication devices 102, 104, and 106 to place the outgoing calls, access the Internet, and send one or more of the emails, the instant messages, and the short message service messages. The users 116, 118, and 120 employ the speaker and/or the display to receive one or more of the incoming calls, the restrictions, the notifications, the emails, the instant messages, the short message service messages, and the determinations of allowability.

In one example, the application server component 108 transfers the restrictions between the communication devices 102, 104, and 106. For example, the application server component 108 receives the restrictions from the communication device 102. Upon an update of the restrictions, the communication device 104 in one example downloads the restrictions from the application server component 108. The application server component 108 in one example comprises an internal database that stores the restrictions.

In another example, the application server component 108 transfers the notifications between the communication devices 102, 104, and 106. For example, the communication device 104 sends the notifications to the application server component 108. Upon receipt of the notifications, the application server component 108 sends the notifications to the communication device 102.

The application server component 108 in one example comprises an instance of the recordable data storage medium 114. In one example, the control component 110 and the application server component 108 are separate components. In another example, the control component 110 and the application server component 108 are the same component.

The control component 110 in one example comprises a call state control function ("CSCF"). In one example, where one or more of the communication devices 102, 104, and 106 comprise one or more of a personal digital assistant, a soft phone, and a computer, the control component 110 comprises one or more of a gateway general packet radio service support node ("GGSN") and a serving general packet radio service support node ("SGSN"). In another example, where one or more of the communication devices 102, 104, and 106 comprise a mobile phone and a telephonic device the control component 110 comprises one or more switch functions.

In one example, the control component 110 receives one or more requests for a communication session from the communication device 104 for the communication device 106. For example, the communication device 104 attempts to place an outgoing call or send one or more of an email, an instant message, and a short message service message to the communication device 106. The communication device 104 makes a determination of allowability of the communication session based on the restrictions at the communication device 104. In one example, the communication device 104 rejects the communication session. In another example, the communication device 106 allows the communication session. Upon an allowance of the communication session, the control component 110 connects the communication device 104 with the communication device 106 in the communication session.

In another example, the control component 110 receives one or more requests for a communication session from the communication device 106 for the communication device 104. For example, the communication device 104 attempts to receive one or more of an incoming call, an email, an instant message, and a short message service message from the communication device 106. The control component 110 makes a determination of session information from the communication session. Upon the determination of the session information, the control component 110 sends the session information to the communication device 104. Upon receipt of the session information, the communication device 104 makes a determination of allowability of the communication session based on the session information. In one example, the communication device 104 allows the communication session. Upon an allowance of the communication session, the control component 110 connects the communication device 106 with the communication device 104 in the communication session. In another example, the communication device 104 rejects the communication session.

Upon a rejection of the communication session, where the communication device 104 receives the one or more requests for the communication session, the control component 110 alerts the media resource component 112 to send an announcement of the rejection to the communication device 106. The media resource component 112 in one example plays the announcement for the communication device 106. The control component 110 in one example receives an acknowledgement that the announcement was played. The media resource component 112 in one example comprises an instance of the recordable data storage medium 114.

An illustrative description of exemplary operation of the apparatus 100 is presented, for explanatory purposes. Message flow 202 represents an exemplary employment of restrictions and updates of the restrictions that the communication device 102 sets for the communication device 104. For example, the communication device 102 sets one or more restrictions and/or updates of the restrictions at the application server component 108. The communication device 104 downloads the restrictions and/or the updates from the application server component 108. The communication device 104 stores the restrictions and the updates in an internal database.

The user 116 in one example employs the communication device 102 to set one or more restrictions 204 for the communication device 104. The communication device 102 sends the one or more restrictions 204 to the application server component 108. "SET RESTRICTIONS FOR UE" in one example serves to represent the restrictions 204. Upon the receipt of the one or more restrictions 204, the application server component 108 sends one or more restrictions 206 to the communication device 104. For example, the communication device 104 downloads the one or more restrictions 206 from the application server component 108. "SEND RESTRICTIONS TO UE" in one example serves to represent the one or more restrictions 206. Upon receipt of the one or more restrictions 206, the communication device 104 stores one or more restrictions 208 in an internal database. "DATA STORED IN UE DATABASE" in one example serves to represent the one or more restrictions 208.

The user 116 in one example may wish to update the one or more restrictions 208 at a later time. The user 116 employs the communication device 102 to send one or more updates 210 of the restrictions 208 to the application server component 108. "UPDATE RESTRICTION FOR UE" in one example serves to represent the one or more updates 210 of the restrictions 208. For example, upon receipt of the one or more updates 210 of the restrictions 208 and one or more of a power up of the communication device 104, a connection of the communication device 104 with a new mobile service switching center ("MSC"), and a set length of time, the communication device 104 downloads one or more updates 212 of the restrictions 208 from the application server component 108. "SEND UPDATED RESTRICTIONS TO UE" in one example serves to represent the one or more updates 212 of the restrictions 208. Upon receipt of the one or more updates 212 of the restrictions 208, the communication device 104 updates one or more restrictions 214 in the internal database of the communication device 104. "UPDATE DATA IN UE DATABASE" in one example, serves to represent the one or more restrictions 214.

Figure 3:
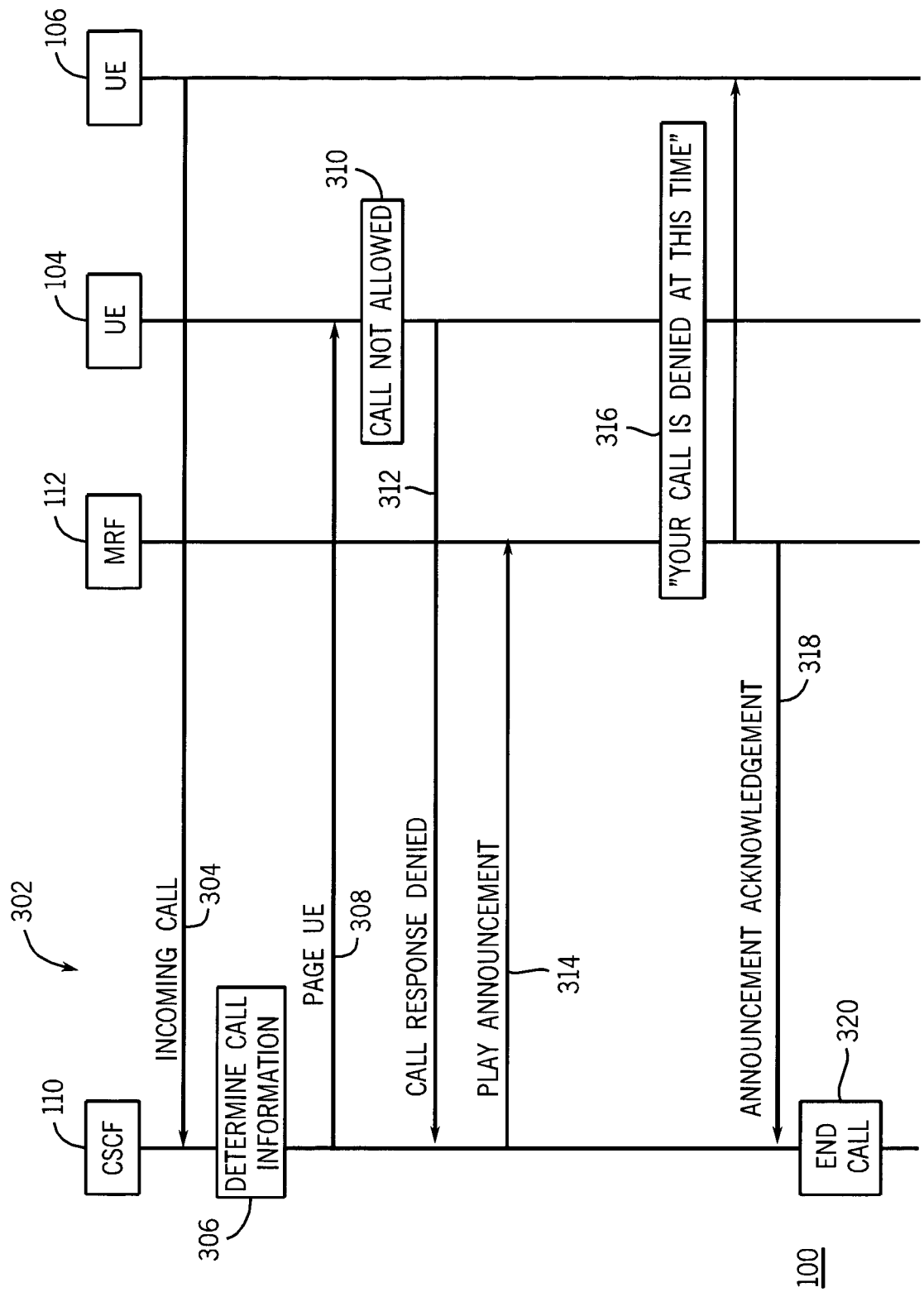
FIG. 3 is a representation of an exemplary implementation of a message flow illustrating an employment of restrictions communication sessions that comprise incoming calls by the communication device of FIG. 1.

Turning to FIGS. 1 and 3, message flow 302 represents an exemplary employment of restrictions of communication sessions by the communication device 104. For example, the communication device 104 receives an incoming call from the communication device 106. The communication device 104 makes a determination of allowability of the incoming call. For example, the communication device 104 rejects the incoming call. Upon a rejection of the incoming call, the media resource component 112 sends an announcement of the rejection to the communication device 106.

The communication device 106 attempts to place an incoming call 304 to the communication device 104. "INCOMING CALL" in one example serves to represent the incoming call 304. Upon receipt of the incoming call 304, the control component 110 makes a determination of session information 306 from the incoming call 304. "DETERMINE CALL INFORMATION" in one example, serves to represent the session information 306. Upon the determination of the session information 306, the control component 110 sends session information 308 to the communication device 104. "PAGE UE" in one example serves to represent the session information 308.

Upon receipt of the session information 308, the communication device 104 makes a determination of allowability 310 of the incoming call 304. "CALL NOT ALLOWED" in one example serves to represent the determination of allowability 310 of the incoming call 304. For example, communication device 104 rejects the incoming call 304. Upon the determination of allowability 310, the communication device 104 alerts the control component 110 of a rejection 312 of the incoming call 304. "CALL RESPONSE DENIED" in one example serves to represent the rejection 312.

Upon the receipt of the rejection 312, the control component 110 alerts the media resource component 112 to send an announcement 314 of the rejection 312. "PLAY ANNOUNCEMENT" in one example serves to represent the announcement 314. Upon receipt of the announcement 314, the media resource component 112 plays an announcement 316 of the rejection 312 for the communication device 106. "YOUR CALL IS DENIED AT THIS TIME" in one example serves to represent the announcement 316.

Upon receipt of the announcement 316, the media resource component 112, sends an acknowledgement 318 of the announcement 316 to the control component 110.

"ANNOUNCEMENT ACKNOWLEDGEMENT" in one example serves to represent the acknowledgement 318. Upon receipt of the acknowledgement 318, the control component 110 determines a completion 320 of the incoming call 304. "END CALL" in one example serves to represent the completion 320 of the incoming call 304.

Figure 4:
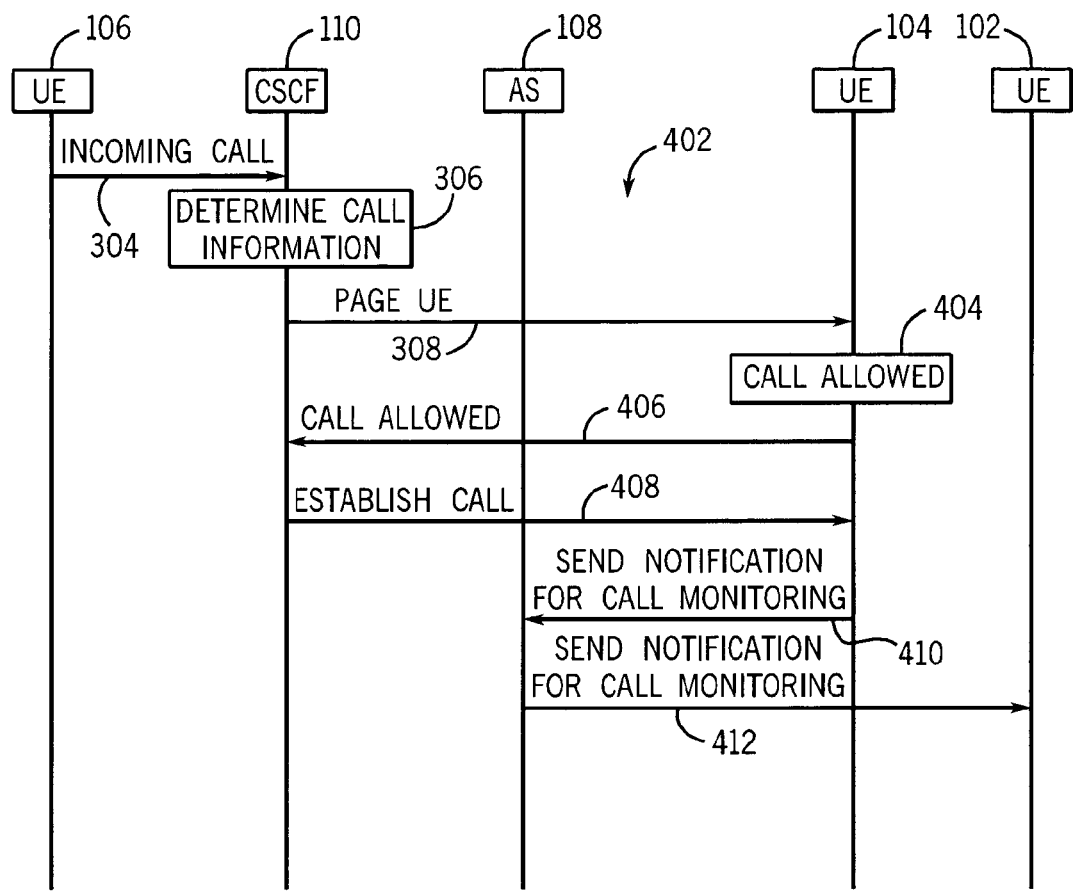
FIG. 4 is a representation of an exemplary implementation of a message flow illustrating an employment of restrictions and notifications of communication sessions that comprise incoming calls by the communication device of FIG. 1.

Turning to FIGS. 1 and 4, message flow 402 represents an exemplary employment of restrictions and notifications of communication sessions by the communication device 104. For example, the communication device 106 attempts to place an incoming call 304 to the communication device 104. The control component 110 receives the incoming call 304 from the communication device 106. Upon receipt of the incoming call 304, the control component 110 makes a determination of session information 306 from the incoming call 304. Upon the determination of the session information 306, the control component 110 sends session information 308 to the communication device 104 as described in message flow 302.

Upon receipt of the session information 308, the communication device 104 makes a determination of allowability 404 of the incoming call 304. "CALL ALLOWED" in one example serves to represent the determination of allowability 404 of the incoming call 304. For example, the communication device 104 allows the incoming call 304. Upon the determination of allowability 404, the communication device 104 alerts the control component 110 of an allowance 406 of the incoming call 304. "CALL ALLOWED" in one example serves to represent the allowance 406. Upon receipt of the allowance 406, the control component 110 connects the communication device 104 with the communication device 106 in a communication session 408. "ESTABLISH CALL" in one example serves to represent the communication session 408.

Upon establishment of the communication session 408, the communication device 104 sends a notification 410 of the communication session 408 to the application server component 108. "SEND NOTIFICATION FOR CALL MONITORING" in one example serves to represent the notification 410. Upon receipt of the notification 410, the application server component 108 sends a notification 412 of the communication session 408 to the communication device 102. "SEND NOTIFICATION FOR CALL MONITORING" in one example serves to represent the notification 412. For example, the user 116 of the communication device 102 employs the notification 412 to monitor the communication session 408 of the communication devices 104 and 106.

Figure 5:
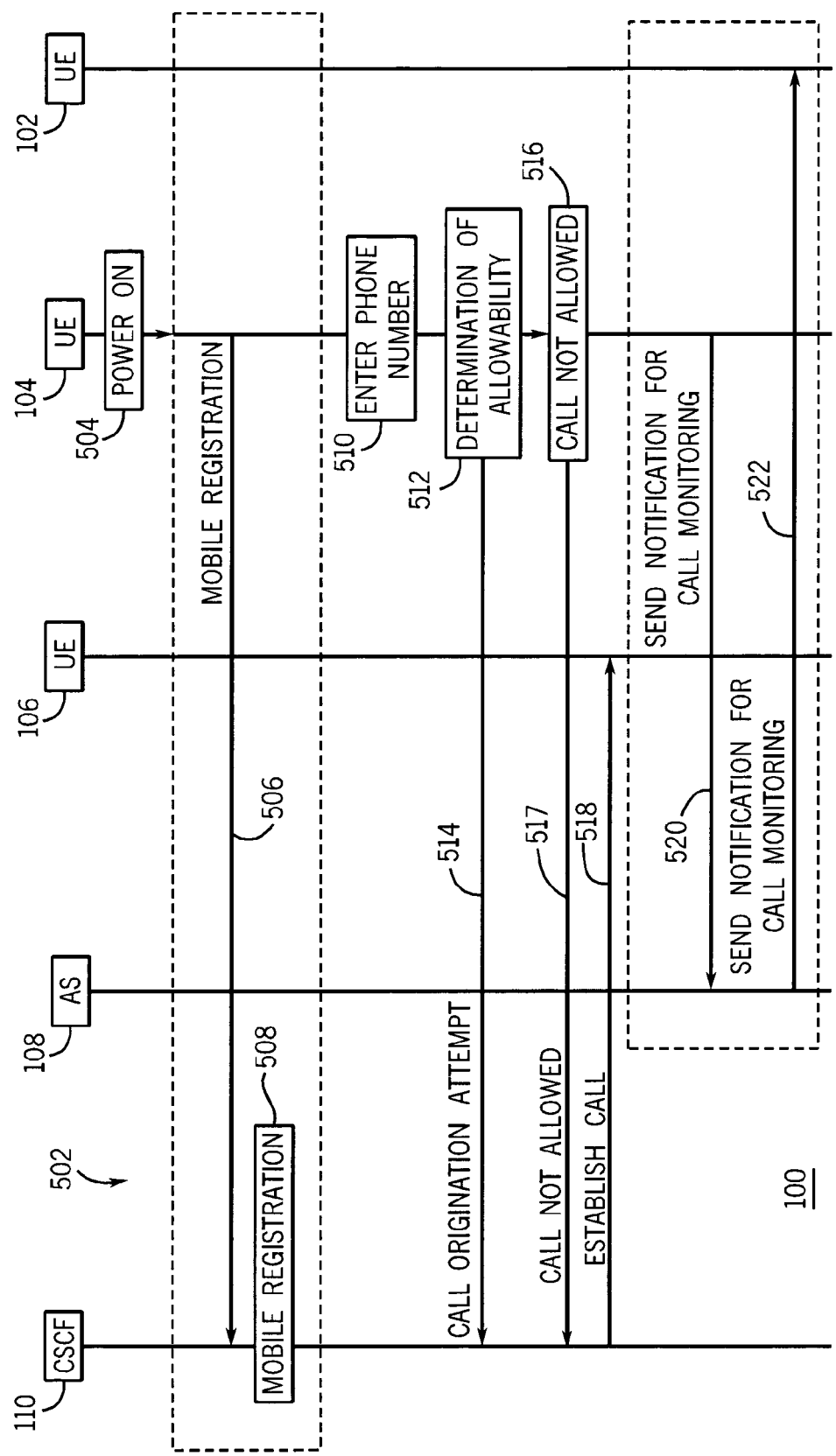
FIG. 5 is a representation of an exemplary implementation of a message flow illustrating an employment of restrictions and notifications of communication sessions that comprise outgoing calls by the communication device of FIG. 1.

Turning to FIGS. 1 and 5, message flow 502 represents an exemplary employment of restrictions and notifications of communication sessions by the communication device 104. For example, the user 118 powers up the communication device 104. The communication device 104 registers with the control component 110. The communication device 104 attempts to place an outgoing call to the communication device 106. The communication device 104 makes a determination of allowability of the outgoing call. Upon the determination of allowability, the communication device 104 in one example sends a notification of the outgoing call to the communication device 102.

The user 118 powers up the communication device 104. "POWER ON" in one example, serves to represent a power up 504 of the communication device 104. Upon the power up 504, the communication device 104 registers with the control component 110. "MOBILE REGISTRATION" in one example serves to represent a registration 506 of the communication device 104. Upon the registration 506, where the user 116 has updated one or more restrictions for the communication device 104, the control component 110 in one example sends an update of the restrictions 508 to the communication device 104. "MOBILE REGISTRATION" in one example serves to represent the update of the restrictions 508.

Upon one or more of the registration 506 and the update of restrictions 508, the user 118 of the communication device 104 attempts to communicate in a communication session with the user 120 of the communication device 106. For example, the user 118 employs the communication device 104 to enter a phone number 510 of the communication device 106. "ENTER PHONE NUMBER" in one example serves to represent the phone number 510. Once the user 118 inputs the phone number 510, the communication device 104 makes a determination of allowability 512 of an outgoing phone call. "DETERMINATION OF ALLOWABILITY" in one example serves to represent the determination of allowability 512.

In one example, the determination of allowability 512 comprises an allowance or a rejection 516 of the outgoing call. Upon the determination of allowability 512, the control component sets up a connection 514 between the communication devices 104 and 106. "CALL ORIGINATION ATTEMPT" in one example serves to represent the connection 514.

Where the determination of allowability 512 comprises the rejection 516 of the outgoing call, the communication device 104 rejects the phone number 510 of the communication device 106. "CALL NOT ALLOWED" in one example serves to represent the rejection 516. Upon the rejection 516, the communication device 104 sends a rejection 517 to the control component 110. "CALL NOT ALLOWED" in one example serves to represent the rejection 517. The control component 110 ends the connection 514 between the communication devices 104 and 106.

Where the determination of allowability 512 comprises the allowance, the control component 110 connects the communication device 104 with the communication device 106 in a communication session 518. "ESTABLISH CALL" in one example serves to represent the communication session 518.

Upon the rejection 517 or an onset of the communication session 518, the communication device 104 sends a notification 520 of the rejection 517 or the onset of the communication session 518 to the application server component 108. "SEND NOTIFICATION FOR CALL MONITORING" in one example serves to represent the notification 520. Upon receipt of the notification 520, the application server component 108 sends a notification 522 to the communication device 102 of the rejection 517 or the onset of the communication session 518. "SEND NOTIFICATION FOR CALL MONITORING" in one example serves to represent the notification 522. For example, the communication device 102 employs the notification to monitor the rejection 517 or the onset of the communication session 518 from the communication device 104.

The apparatus 100 in one example employs one or more computer-readable media. Examples of a computer-readable medium for the apparatus 100 comprise the recordable data storage medium of the communication devices 102, 104, and 106, the application server component 108, the control component 110, and the media resource component 112. For example, the computer-readable medium for the apparatus 100 comprises one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a first communication device that shares a billing relationship with a second communication device; and
an application server configured to receive one or more notifications that comprise one or more of a voice message and an instant message sent from the first communication device and to send the one or more notifications to the second communication device, at least one of the one or more notifications being employed by a user associated with the second communication device to monitor one or more communication sessions of the first communication device upon establishment of the one or more communication sessions;
wherein the second communication device comprises a primary communication device, and wherein the user associated with the second communication device comprises a primary user associated with the primary communication device; and
wherein the primary user associated with the primary communication device sets one or more restrictions for the first communication device; and
wherein the first communication device is configured to employ one or more of the one or more restrictions stored in an internal database of the first communication device to make a determination of allowability of the one or more communication sessions.

2. The apparatus of claim 1, wherein the user associated with the second communication device sets the one or more restrictions at the application server component; and
wherein upon receipt of the one or more restrictions, the first communication device downloads the one or more restrictions from the application server component.

3. The apparatus of claim 2, wherein the user associated with the second communication device sets the one or more restrictions at a website associated with the application server component.

4. The apparatus of claim 2, wherein the second communication device sends an update of the one or more restrictions to the application server component; and
wherein upon receipt of the update of the one or more restrictions, the first communication device downloads the update of the one or more restrictions from the application server component.

5. The apparatus of claim 1, wherein the one or more communication sessions comprise an incoming call from a third communication device; and
wherein the first communication device employs the one or more of the one or more restrictions to make the determination of allowability of the incoming call.

6. The apparatus of claim 5, wherein the first communication device allows the incoming call, a control component connects the first communication device to the incoming call of the third communication device; and
wherein the first communication device sends one or more notifications of the incoming call to the second communication device.

7. The apparatus of claim 5, wherein the first communication device rejects the incoming call; and
wherein the first communication device sends one or more notifications of the incoming call to the second communication device.

8. The apparatus of claim 7, wherein the user of the first communication device is unaware of the incoming call.

9. The apparatus of claim 1, wherein the one or more communication sessions comprise an outgoing call to a third communication device; and
wherein the first communication device employs the one or more of the one or more restrictions to make the determination of allowability of the outgoing call.

10. The apparatus of claim 9, wherein the first communication device allows the outgoing call, a control component connects the first communication device to the outgoing call of the third communication device; and
wherein the first communication device sends one or more notifications of the outgoing call to the second communication device.

11. The apparatus of claim 9, wherein the first communication device rejects the outgoing call; and
wherein the first communication device sends one or more notifications of the outgoing call to the second communication device.

12. The apparatus of claim 1, wherein the first communication device shares the billing relationship with the second communication device; and
wherein the billing relationship comprises a shared mobile group plan.

13. A method, comprising the steps of:
setting one or more restrictions at an application server for a first communication device by a user associated with a second communication device, wherein the first communication device shares a billing relationship with the second communication device;
receiving, at the application server, one or more notifications that comprise one or more of a voice message and an instant message sent from the first communication device to the second communication device; and
sending the one or more notifications from the application server to the second communication device, at least one of the one or more notifications being employed by the user associated with the second communication device to monitor one or more communication sessions of the first communication device upon establishment of the one or more communication sessions;
wherein the first communication device is configured to employ one or more of the one or more restrictions received and stored in an internal database of the first communication device to make a determination of allowability of one or more communication sessions.

14. The method of claim 13, wherein the step of setting the one or more restrictions at the application server for the first communication device further comprises the steps of:
receiving at the first communication device the one or more restrictions set by the user associated with the second communication at the application server component, wherein the user associated with the second communication device sets the one or more restrictions at a website associated with the application server component.

15. The method of claim 13, wherein the one or more communication sessions comprise an incoming call from a third communication device, and wherein the incoming call comprises session information, and wherein the method further comprises the steps of:
comparing the session information of the incoming call with the one or more of the one or more restrictions at the first communication device;

allowing the incoming call at the first communication device;

enabling a connection with the third communication device on the incoming call; and sending a notification of the incoming call to the second communication device.

16. The method of claim 13, wherein the one or more communication sessions comprise an incoming call from a third communication device, and wherein the incoming call comprises session information, and wherein the method further comprises the steps of:

comparing the session information of the incoming call with the one or more of the one or more restrictions at the first communication device;

rejecting the incoming call at the first communication device; and sending a notification of the incoming call to the second communication device.

17. The method of claim 13, wherein the one or more communication sessions comprise an outgoing call to a third communication device, and wherein the outgoing call comprises session information, and wherein the method further comprises the steps of:

comparing the session information of the outgoing call with the one or more of the one or more restrictions at the first communication device;

allowing at the first communication device the outgoing call;

enabling a connection with the third communication device on the outgoing call; and sending a notification of the outgoing call to the second communication device.

18. The method of claim 13, wherein the one or more communication sessions comprise an outgoing call to a third communication device, and wherein the outgoing call comprises session information, and wherein the method further comprises the steps of:

comparing the session information of the outgoing call with the one or more of the one or more restrictions at the first communication device;

rejecting at the first communication device the outgoing call; and sending a notification of the outgoing call to the second communication device.

19. A non-transitory computer-readable medium having computer executable instructions for performing steps, comprising:

means in the computer-readable medium for setting one or more restrictions at an application sever for a first communication device by a user associated with a second communication device, wherein the first communication device shares a billing relationship with the second communication device;

means in the computer-readable medium for receiving, at the application server, one or more notifications that comprise one or more of a voice message and an instant message sent from the first communication device to the second communication device; and means in the computer-readable medium for sending the one or more notifications from the application server to the second communication device, at least one of the one or more notifications being employed by the user associated with the second communication device to monitor one or more communication sessions of the first communication device upon establishment of the one or more communication;

wherein the first communication device is configured to employ one or more of the one or more restrictions received and stored in an internal database of the first communication device to make a determination of allowability of one or more communication sessions.

20. The computer-readable medium of claim 19, wherein the means in the computer-readable medium for setting one or more restrictions at an application server for the first communication device comprise:

means in the computer-readable medium for receiving at the first communication device the one or more restrictions set by the user associated with the second communication at an application server component, wherein the user associated with the second communication device sets the one or more restrictions at a website associated with the application server component.

21. The apparatus of claim 1, wherein the first communication device makes the determination of allowability when a user associated with the first communication device enters a phone number.

22. The apparatus of claim 1, wherein the one or more restrictions are based on one or more of an email address, an instant message handle address, and a short message service address.

23. The apparatus of claim 1, wherein the first communication device employs the one or more of the one or more restrictions to make the determination of allowability of instant message usage.

24. The apparatus of claim 7, wherein another one of the one or more notifications comprises a SMS message.

25. The apparatus of claim 24, wherein the one or more notifications further comprises an email message.

26. The apparatus of claim 23, wherein the one or more restrictions further comprise one or more of a time of day, length of the communication session, minute proportioning, a phone number.

27. The apparatus of claim 1, wherein the first communication device or the second communication device is a soft phone.

28. The apparatus of claim 1, wherein the first communication device or the second communication device is a computer.

29. The apparatus of claim 1, wherein the first communication device or the second communication device is a mobile phone.

30. The apparatus of claim 1, wherein the first communication device stores received updates of the one or more restrictions in the internal database.

31. The apparatus of claim 1, wherein at least one of the one or more communication sessions is a data session.

32. The apparatus of claim 7, wherein a control component alerts a media resource component to send an announcement of the rejection to the third communication device.

33. The apparatus of claim 1, wherein the second communication device sends one or more notifications to an application server component, and upon receipt of the one or more notifications, the application server component sends the one or more notifications to the first communication device.

34. The apparatus of claim 1, wherein the application server comprises one of a biological and an atomic data storage medium.

* * * * *